(12) United States Patent
Lainema

(10) Patent No.: US 8,077,991 B2
(45) Date of Patent: Dec. 13, 2011

(54) SPATIALLY ENHANCED TRANSFORM CODING

(75) Inventor: Jani Lainema, Tampere (FI)

(73) Assignee: Nokia Corporation, Espoo (FI)

( * ) Notice: Subject to any disclaimer, the term of this patent is extended or adjusted under 35 U.S.C. 154(b) by 915 days.

(21) Appl. No.: 12/101,019

(22) Filed: Apr. 10, 2008

(65) Prior Publication Data

US 2008/0260270 A1     Oct. 23, 2008

Related U.S. Application Data

(60) Provisional application No. 60/911,480, filed on Apr. 12, 2007.

(51) Int. Cl.
*G06K 9/46*   (2006.01)

(52) U.S. Cl. .................. 382/236; 382/232; 382/238

(58) Field of Classification Search .............. 382/238, 382/232, 166, 103, 173, 275; 348/169, 581; 704/500, 219; 375/240.12, 240.14, 244
See application file for complete search history.

(56) References Cited

U.S. PATENT DOCUMENTS

| | | | | |
|---|---|---|---|---|
| 4,125,861 A | * | 11/1978 | Mounts et al. | ........... 375/240.12 |
| 5,598,214 A | * | 1/1997 | Kondo et al. | ........... 375/240.14 |
| 6,498,810 B1 | * | 12/2002 | Kim et al. | ..................... 375/240 |
| 2007/0064797 A1 | | 3/2007 | Miao et al. | |

FOREIGN PATENT DOCUMENTS

JP     02002152049 A  *  5/2002

OTHER PUBLICATIONS

Santago P., et al. "Using Convex Set Techniques for Combined Pixel and Frequency Domaincoding of Time-Varying Images." IEEE Journal on Selected Areas in Communications, IEEE Service Center, vol. SAC-05, No. 7, Aug. 1, 1987, pp. 1127-1139.

Smith J., et al. "Joint adaptive space and frequency basis selection." IMAGE Processing, Proceedings., International Conference on Santa Barbara, CA, USA Oct. 26-29, 1997, vol. 3, pp. 702-705.

Clarke, R. J. "On Transform Coding Motion-Compensated Difference Images" IEE Proceedings I. Solid-State & Electron Devices, Institution of Electrical Engineers. vol. 139, No. 3 part 1, Jun. 1, 1992, pp. 372-376.

Wiegand T. et al. "Overview of the H.264/AVC video coding standard." IEEE Transactions on Circuits and Systems for Video Technology, IEEE Service Center, vol. 13, No. 7, Jul. 1, 2003, pp. 560-576.

Segall C. A. et al. "Pre- and post-processing algorithms for compressed video enhancements." Signals, Systems and Computers. Conference Record of the Thirty-Fourth Asilomar Conference on Oct. 29-Nov. 1, 2000, vol. 2, pp. 1369-1373.

The International Search Report PCT Application No. PCT/IB2008/051351.

English translation of Office action for corresponding Korean Application No. 2009-7023527 dated Jan. 6, 2011.

(Continued)

*Primary Examiner* — Anh Hong Do

(74) *Attorney, Agent, or Firm* — AlbertDhand LLP

(57) ABSTRACT

A system and method for improving prediction error coding performance of various video compression algorithms. Various embodiments combine the energy compaction features of transform coding with localization properties of spatial coding. In various embodiments, the effects of pixel "outliers" are removed from the transform and are coded separately as a spatially coded pixel prediction, thereby improving the coding gain of the transform.

39 Claims, 9 Drawing Sheets

OTHER PUBLICATIONS

Office Action for Chinese Patent Application No. 200880017526.3., dated May 18, 2011.
English translation of Office Action for Chinese Patent Application No. 200880017526.3., dated May 18, 2011.
Office Action for Mexican Patent Application No. MX/a/2009/010921, dated Mar. 23, 2011.
English translation of Office Action for Mexican Patent Application No. MX/a/2009/010921, dated Mar. 23, 2011.

* cited by examiner

SPATIALLY ENHANCED TRANSFORM CODING

FIELD OF THE INVENTION

The present invention relates to the coding and decoding of digital video material. More particularly, the present invention relates to prediction error coding in both frequency and spatial domains.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A video codec comprises an encoder that transforms input video into a compressed representation suited for storage and/or transmission and a decoder that can uncompress the compressed video representation back into a viewable form. Typically, the encoder discards some information in the original video sequence in order to represent the video in a more compact form, i.e., at a lower bitrate.

Typical hybrid video codecs, for example ITU-T H.263 and H.264, encode video information in two phases. In the first phase, pixel values in a certain picture area or "block" are predicted. These pixel values can be predicted, for example, by motion compensation mechanisms, which involve finding and indicating an area in one of the previously coded video frames that corresponds closely to the block being coded. Additionally, pixel values can be predicted via by spatial mechanisms, which involve using the pixel values around the block to be coded in a specified manner. The second phase involves coding the prediction error, i.e. the difference between the predicted block of pixels and the original block of pixels. This is typically accomplished by transforming the difference in pixel values using a specified transform (e.g., a Discreet Cosine Transform (DCT) or a variant thereof), quantizing the coefficients, and entropy coding the quantized coefficients. By varying the fidelity of the quantization process, the encoder can control the balance between the accuracy of the pixel representation (i.e., the picture quality) and the size of the resulting coded video representation (i.e., the file size or transmission bitrate).

The decoder reconstructs output video by applying prediction mechanisms that are similar to those used by the encoder in order to form a predicted representation of the pixel blocks (using motion or spatial information created by the encoder and stored in the compressed representation) and prediction error decoding (the inverse operation of the prediction error coding, recovering the quantized prediction error signal in the spatial pixel domain). After applying prediction and prediction error decoding processes, the decoder sums up the prediction and prediction error signals (i.e., the pixel values) to form the output video frame. The decoder (and encoder) can also apply additional filtering processes in order to improve the quality of the output video before passing it for display and/or storing it as a prediction reference for the forthcoming frames in the video sequence.

In typical video codecs, the motion information is indicated with motion vectors associated with each motion-compensated image block. Each of these motion vectors represents the displacement of the image block in the picture to be coded (in the encoder side) or decoded (in the decoder side) and the prediction source block in one of the previously coded or decoded pictures. In order to represent motion vectors efficiently, motion vectors are typically coded differentially with respect to block specific predicted motion vectors. In a typical video codec, the predicted motion vectors are created in a predefined way, for example by calculating the median of the encoded or decoded motion vectors of the adjacent blocks.

Typical video encoders utilize Lagrangian cost functions to find optimal coding modes, e.g., the desired macroblock mode and associated motion vectors. This kind of cost function uses a weighting factor $\lambda$ to tie together the exact or estimated image distortion due to lossy coding methods and the exact or estimated amount of information that is required to represent the pixel values in an image area:

$$C=D+\lambda R \qquad (1)$$

In Eq. (1), C is the Lagrangian cost to be minimized, D is the image distortion (e.g., the mean squared error) with the mode and motion vectors considered, and R the number of bits needed to represent the required data to reconstruct the image block in the decoder (including the amount of data to represent the candidate motion vectors).

Transform coding of the prediction error signal in video or image compression system typically comprises DCT-based linear transform, quantization of the transformed DCT coefficients, and context based entropy coding of the quantized coefficients. However, the transform can efficiently pack energy of the prediction error signal only under certain statistics, and the coding performance deteriorates when the prediction error to be transformed becomes less correlated. This causes suboptimal performance, especially in modern video and image coding systems employing advanced motion compensation and spatial prediction processes in order to achieve good quality predictions for the image blocks to be coded (thus, minimizing and decorrelating the prediction error signal).

To address some of the above issues, a number of hybrid video coding schemes have been developed. These hybrid systems typically comprise a hybrid of two redundancy reduction techniques—prediction and transformation. Prediction can take the form of inter-picture prediction, which is used to remove temporal redundancies in the signal. Intra-picture prediction may also be used in the H.264/Advanced Video Coding (AVC) standard where spatial redundancies are removed by exploiting the similarities between neighboring regions within a picture frame. As a consequence of these inter-picture and intra-picture prediction techniques, a residual/error signal is formed by removing the predicated picture frame from the original. This prediction error signal is then typically block transform coded using an 8×8 DCT transform in order to reduce spatial redundancies in the signal.

SUMMARY OF THE INVENTION

Various embodiments of the present invention provide a system and method for representing the prediction error signal as a weighted sum of different basis functions of a selected transform and quantized spatial samples. The basis functions of the selected transform may comprise an orthogonal set of basis vectors, or the basis functions may not comprise an orthogonal set. According to various embodiments, the prediction error signal for a single image block is constructed using both transform basis functions and spatial samples (i.e., pixel values), thereby combining the desired features of both the transform and spatial coding approaches discussed previously. This allows for the utilization of those selected transform basis functions that give good overall representation of the image block with minimal amount of transform coefficients (representing the component of prediction error signal that is well correlated with the basis functions). Additionally, various embodiments of the present invention allow for the efficient spatial representation of those components of the prediction error signal of the same image block that are not well correlated with the basis functions of the applied transform (such as certain types of sensor noise, high frequency texture and edge information).

According to various embodiments of the present invention, a system and method of encoding a prediction error signal for a block of data comprises calculating a difference signal representing differences between sample values of a predicted block of data and values for an original input block. Transform coding and spatial coding are both performed to the difference signal, thereby creating a first and second representations of first and second components of the difference signal. The first and second representations are then combined to provide the prediction error signal.

Various embodiments of the present invention also provide a system and method of decoding a prediction error signal for a block of data, comprising receiving a coded prediction error signal, the coded prediction error signal including a plurality of transform coefficients and a plurality of spatial samples. The plurality of transformed coefficients are decoded into decoded transform information, and the plurality of spatial samples are decoded into decoded spatial information. The decoded transform information, the decoded spatial information, and a reconstructed prediction of the block of data are then added, thereby forming a decoded representation of the block of data.

The implementations of various embodiments of the present invention serve to improve the compression efficiency of modern video and image codecs. Although a certain amount of increased computational complexity of encoding may be needed, fast algorithms can be applied in order to lower the encoding complexity that approaches the complexity level for traditional transform based coding. Any effect on the complexity for a decoder is negligible when implementing various embodiments of the present invention.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Various embodiments of the present invention provide a system and method for representing the prediction error signal as a weighted sum of different basis functions of a selected transform and quantized spatial samples. According to various embodiments, the prediction error signal for a single image block is constructed using both transform basis functions and spatial samples (i.e., pixel values), thereby combining the desired features of both the transform and spatial coding approaches discussed previously. This allows for the utilization of those selected transform basis functions that give good overall representation of the image block with minimal amount of transform coefficients (representing the component of prediction error signal that is well correlated with the basis functions). Additionally, various embodiments of the present invention allow for the efficient spatial representation of those components of the prediction error signal of the same image block that are not well correlated with the basis functions of the applied transform (such as certain types of sensor noise, high frequency texture and edge information).

Figure 1:
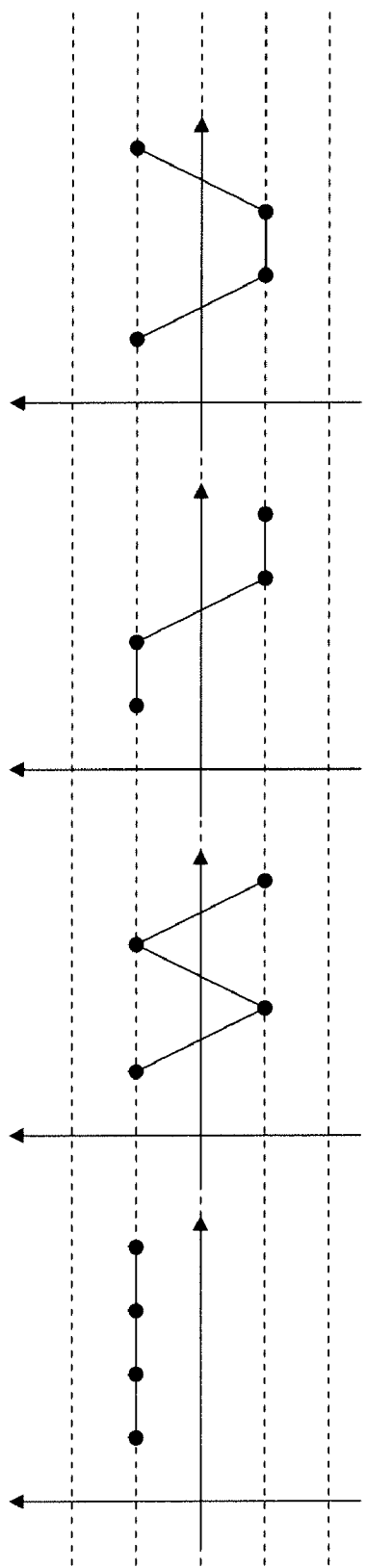
FIG. 1 shows an example of basis functions of a Hadamard transform that can be used to encode image data.
Figure 2:
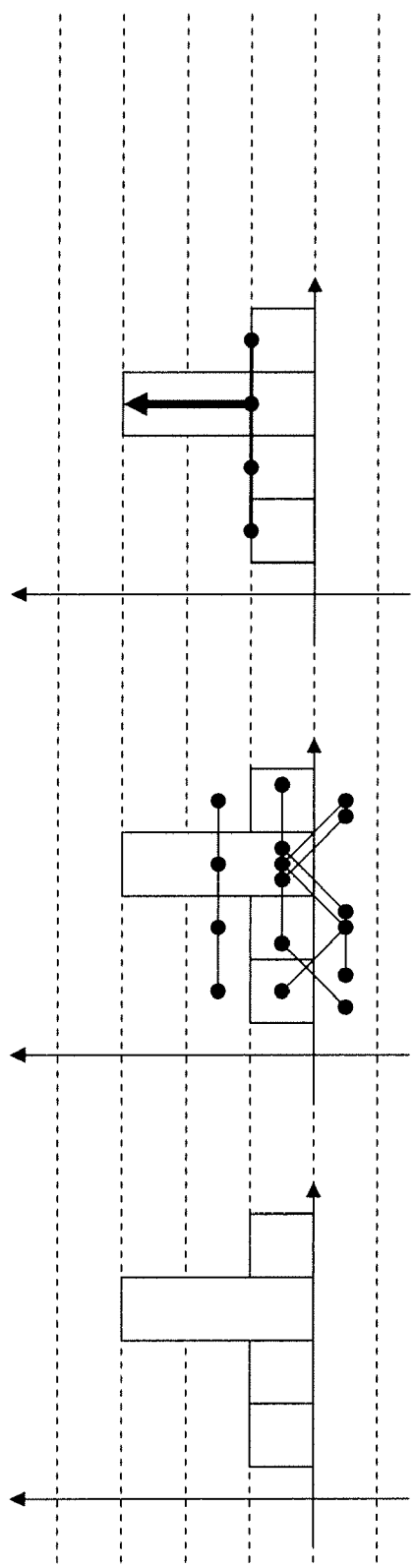
FIG. 2(a) is an example of four scalar values that are to be coded or decoded and representing the prediction error signal between the original image and the prediction image.
FIG. 2(b) shows the four weighted basis functions from FIG. 1 being summed to the prediction error signal.
FIG. 2(c) shows how the same prediction error signal can be reconstructed by summing up only the first basis function and a single spatial sample represented by an arrow.

FIGS. 1 and 2 show a simplified example of how various embodiments of the present invention are operable in one dimension. FIG. 1 shows an example of basis functions of a one-dimensional linear transform that can be used to encode image data (namely a Hadamard transform). The weighted sum of these four basis functions can be used to represent any four samples. FIG. 2(a) is an example of four scalar values that are to be coded or decoded and representing the prediction error signal between the original image and the prediction image. In FIG. 2(b), the four weighted basis functions from FIG. 1 are summed to the prediction error signal (1.5 times the first, 0.5 times the second, −0.5 times the third and −0.5 times the fourth basis function). In FIG. 2(c) it is demonstrated how the same prediction error signal can be reconstructed by summing up only the first basis function and a single spatial sample represented by an arrow. In this example, compression efficiency improvement can be expected, as the signal is represented by a single transform coefficient and a single spatial sample instead of four transform coefficients weighting the four Hadamard basis functions (as shown in FIG. 2(b)).

Figure 3:
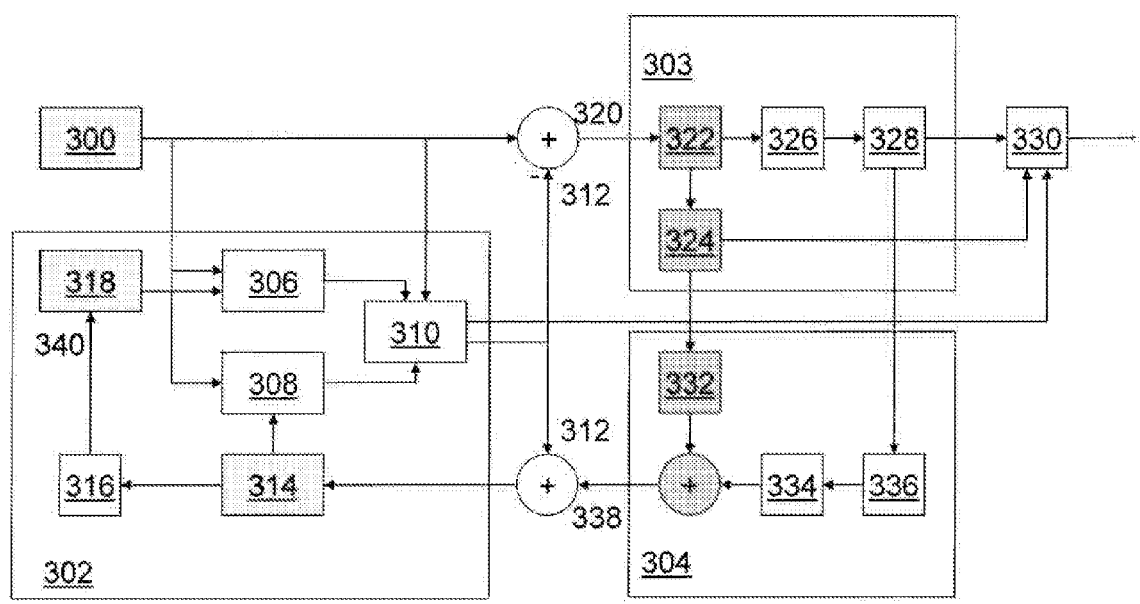
FIG. 3 is a block diagram of a video encoder constructed in accordance with one embodiment of the present invention.

FIG. 3 is a block diagram of a video encoder constructed in accordance with one embodiment of the present invention. More particularly, FIG. 3 shows how an image to be encoded 300 undergoes pixel prediction 302, prediction error coding 303 and prediction error decoding 304. For pixel prediction 302, the image 300 undergoes both inter-prediction 306 and intra-prediction 308 which, after mode selection 310, results in prediction representation of an image block 312. A preliminary reconstructed image 314 is also used for intra-prediction 308. Once all of the image blocks are processed, the preliminary reconstructed image 314 undergoes filtering at 316 to create a final reconstructed image 340, which is sent to a reference frame memory 318 and is also used for inter-prediction 306 of future frames.

The prediction representation of the image block 312, as well as the image to be encoded 300, are used together to define a prediction error signal 320 which is used for prediction error coding 303. In prediction error coding 303, the prediction error signal 320 undergoes feature selection 322 and spatial quantization 324, as well as transform 326 and quantization 328 (both after feature selection 322). The data describing prediction error and predicted representation of the image block 312 (e.g., motion vectors, mode information and quantized DCT+spatial samples) are passed to entropy coding 330. The prediction error decoding 304 is substantially the opposite of the prediction error coding 303, with the prediction error decoding including an inverse spatial quantizer 332, an inverse transform 334 and an inverse quantization 336. The result of the prediction error decoding 304 is a reconstructed prediction error signal 338, which is used in combination with the predicted representation of the image block 312 to create the preliminary reconstructed image 314.

Figure 4:
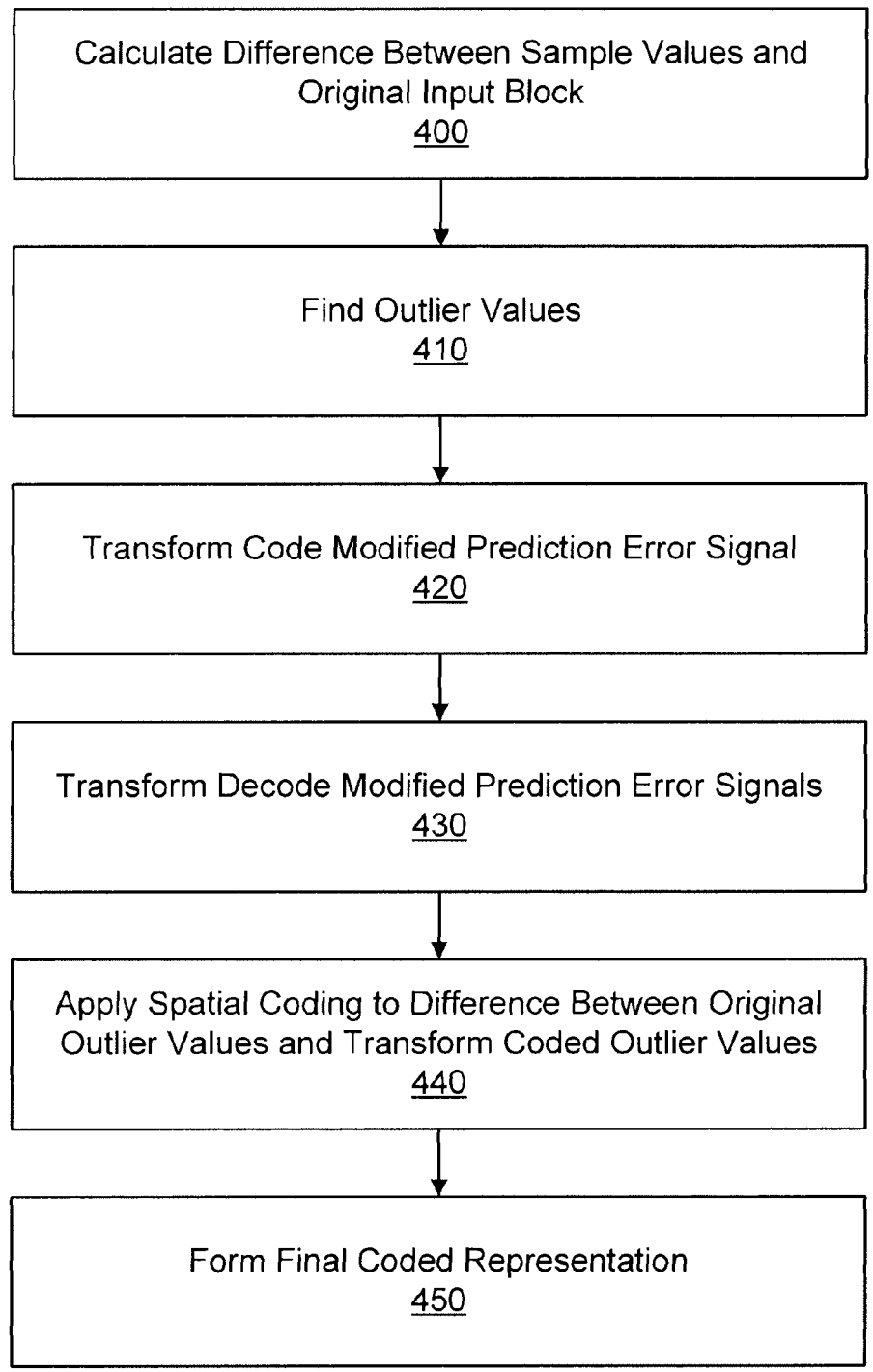
FIG. 4 is a flow chart showing one encoder algorithm which may be used in an embodiment of the present invention.

FIG. 4 is a flow chart showing one encoder algorithm which may be used in an embodiment of the present invention. However, as discussed below, a variety of different algorithms may be used according to principles of the present invention. At 400 in FIG. 4, the difference between sample values of a predicted block and an original input block is calculated. It should be noted that "values" and "outlier values" as used herein are intended to refer to these difference values. At 410, outlier values are found. In this case, the amplitude depends on the expected accuracy of the coded representation; smaller amplitude representations qualify as outliers if one is targeting high bitrate good quality representation, and only high amplitude representations qualify if one is targeting a lower bitrate, lower quality representation. At 420, the modified prediction error signal is transform coded (involving transform, quantization and entropy coding), with the outlier values being substituted by interpolated representations of those values, e.g., by averaging the neighboring prediction error values. At 430, the modified prediction error signals are transform decoded back to the spatial domain. At 440, spatial coding is applied (involving quantization and entropy coding without transform) to the difference between the original outlier values and the transform decoded outlier values. At 450, the final coded representation of the prediction error signal is formed by joining the transform coded data and the spatial coded data. In an alternative embodiment, the spatial coding occurs before transform coding.

When considering the one-dimensional example depicted in FIGS. 2(a)-2(c), the algorithm outlined in FIG. 4 would process the relevant data as follows. As discussed previously, FIG. 2(a) represents the difference signal [1 1 3 1] to be coded. In this case, [3] is an outlier. Therefore, the prediction error signal is modified by substituting the [3] with an average of the second and fourth samples, making the signal [1 1 1 1]. The difference between the original outlier sample ([3]) and the transform coded outlier value ([1]) is then spatial coded, making the spatial coded signal [0 0 2 0]. The entropy coded representations of the transform coded and spatial coded signals are then written to the bitstream. Thereafter, the decoder can recover the coded signal by adding up the inverse transformed data [1 1 1 1] and the inverse spatial coded data [0 0 2 0] (together with the prediction samples of the image block).

When considering the above example, it is important to note that the choice of Hadamard basis vectors for the transform is only intended to be exemplary in nature. In fact, the various methods and techniques described herein can be applied to any transform employing basis functions, and the basis functions do not necessarily need to be orthogonal.

A video or image codec, according to various embodiments the present invention, can be implemented in various ways. In the case of an encoder, the encoder can use different strategies to find the desired transform coefficients and spatial samples. For example, an encoder can first transform code the signal and apply spatial coding to the residual. The encoder can also first apply spatial coding to the signal, followed by transform coding of the residual. Additionally, some or all of the transform coefficients can be set to zero in order to improve the coding performance. Some or all spatial samples can also be set to zero in order to improve the coding performance. An encoder can also iteratively modify transform coefficients and/or spatial samples in order to improve the coding performance until a desired performance or a maximum defined number of iterations is achieved.

In terms of quantization and dequantization, the quantization and dequantization of transform coefficients and spatial samples can be tied together (e.g., a quantization step size for both transform coefficients and spatial samples can be derived from a single parameter). Alternatively, different quantizations and dequantizations can be applied to transform coefficients and spatial samples.

For the coding and decoding of spatial samples, such coding and decoding can depend on transform coefficients and vice versa. Alternatively, the coding and decoding of spatial samples, transform coefficients or both can depend on the prediction signal, on the other transform coefficients and spatial samples in the same image or in other images.

In addition to the above, it can be indicated that there are no transform coefficients or spatial samples for a specific image area or image. It can also be indicated that only spatial coding or only transform coding is used for a specific image area or image. The number of spatial samples can be coded and decoded as one unit, for example representing certain patterns of textures. Pre- and/or post-processing mechanisms can be applied to the prediction signal, prediction error signal reconstructed signal or any combination thereof. The method can be used to code and decode other information instead or in addition to the prediction error signals. The codec can limit the usage of either transform coefficients (e.g., allow only low frequency transform coefficients to be present in the coded representation of the signal) or spatial samples.

Figure 5:
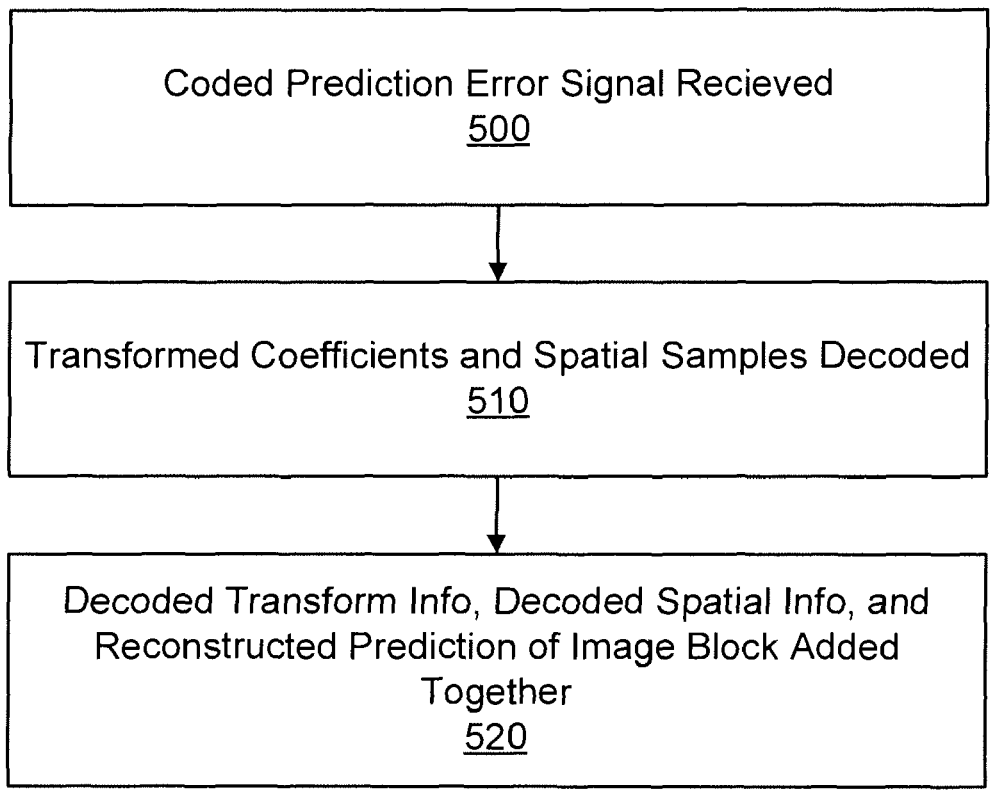
FIG. 5 is a flow chart showing one decoder algorithm which may be used in various embodiments of the present invention.

FIG. 5 shows a decoding process according to various embodiments of the present invention. At 500 in FIG. 5, a video decoder receives a coded prediction error signal which comprises both transformed coefficients and spatial samples. At 510, both the transformed coefficients and the spatial samples are decoded. At 520, the decoded transform information, the decoded spatial information and reconstructed prediction of the image block are added together to form decoded representation of the image block.

Figure 6:
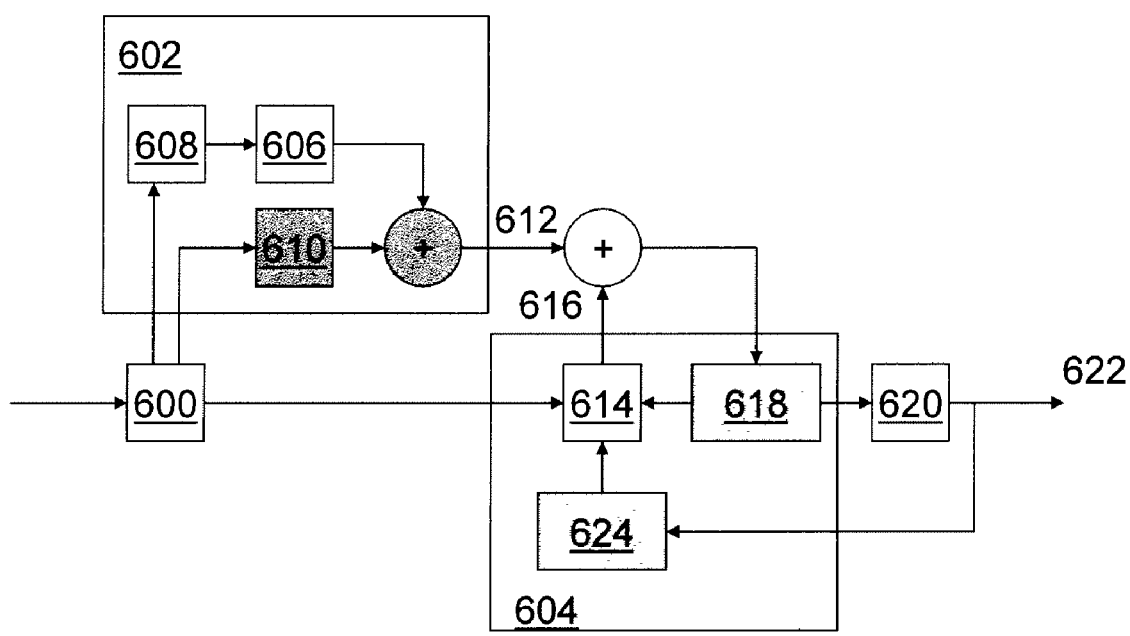
FIG. 6 is a block diagram of a video decoder constructed in accordance with one embodiment of the present invention.

FIG. 6 is a block diagram of a video decoder constructed in accordance with one embodiment of the present invention. As shown in FIG. 6, entropy decoding 600 is followed by both prediction error decoding 602 and pixel prediction 604. In prediction error decoding 602, in addition to an inverse transform 606 and inverse quantization 608, an inverse spatial quantizer 610 is used as discussed herein, ultimately resulting in a reconstructed prediction error signal 612. For pixel prediction 604, either intra-prediction or inter-prediction occurs at 614 to create a predicted representation of an image block 616. The predicted representation of the image block 616 is used in conjunction with the reconstructed prediction error signal 612 to create a preliminary reconstructed image 618, which in turn can be used both for prediction 614. Once all of the image blocks have been processed, the preliminary reconstructed image 618 is passed for filtering 620. The filtered image can also be stored in reference frame memory 624, making it usable for prediction 614 as well.

Figure 7:
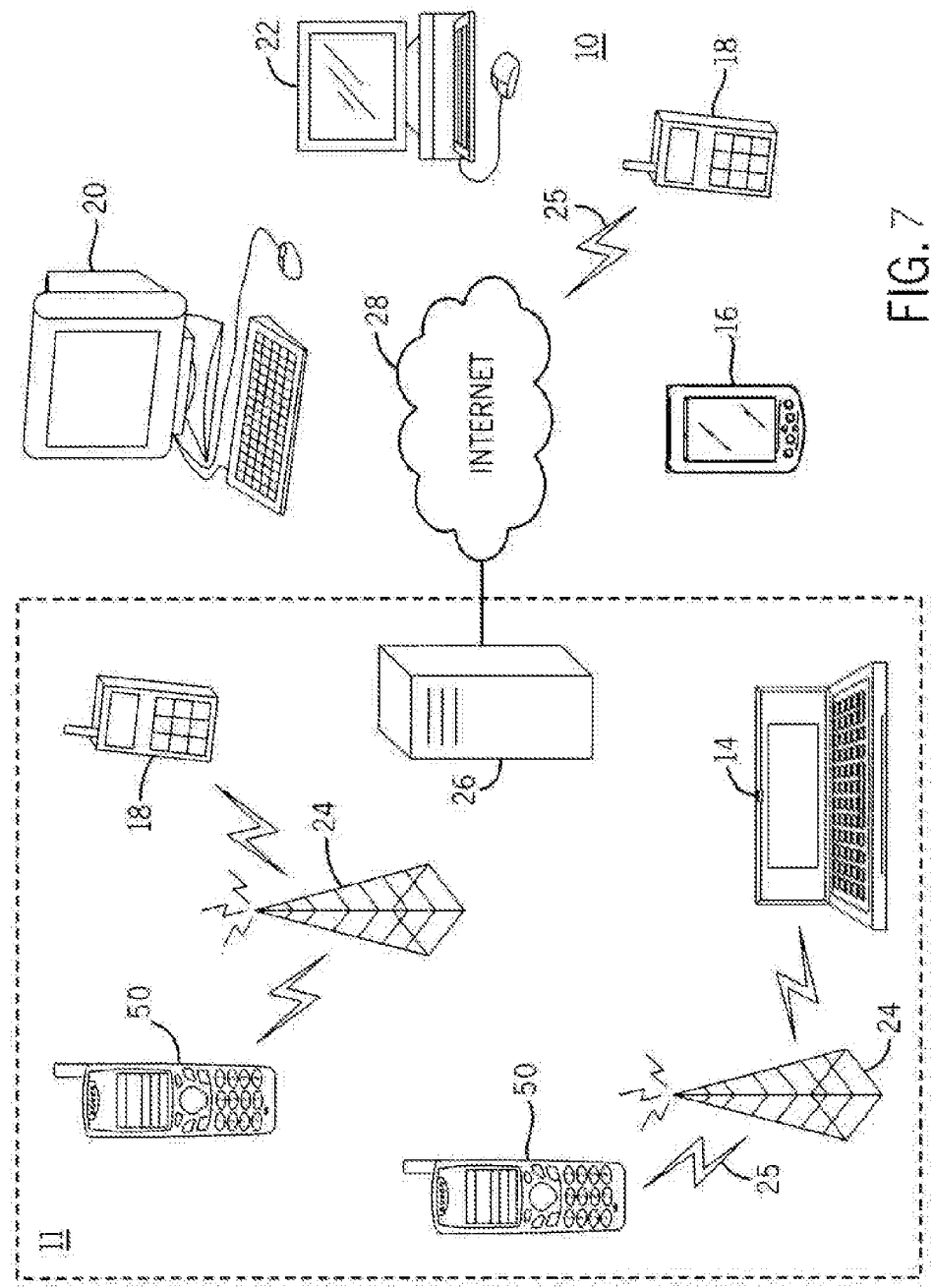
FIG. 7 is an overview diagram of a system within which various embodiments of the present invention may be implemented.

FIG. 7 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 7 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic device 50, a combination personal digital assistant (PDA0 and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 8:
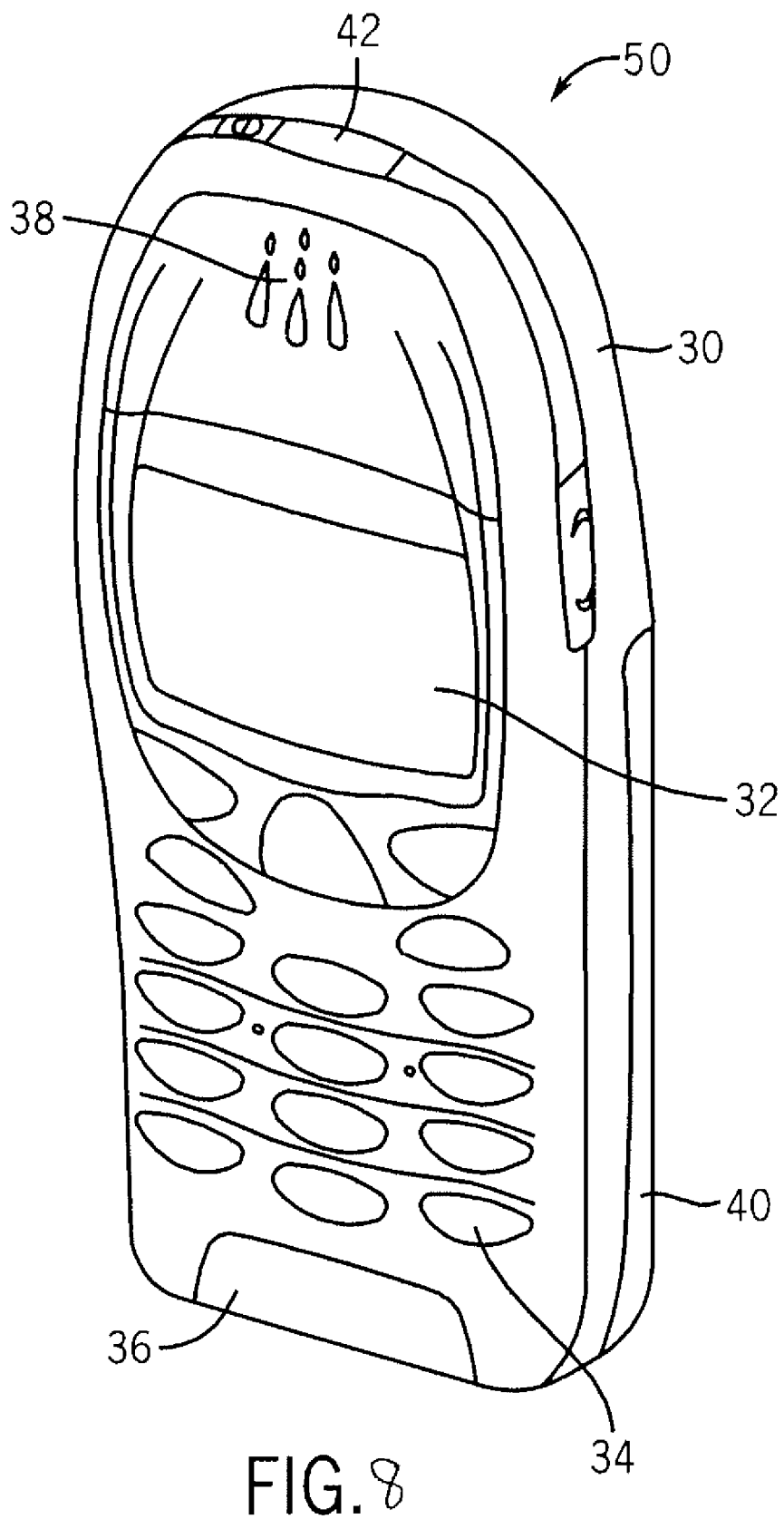
FIG. 8 is a perspective view of an electronic device that can be used in conjunction with the implementation of various embodiments of the present invention.
Figure 9:
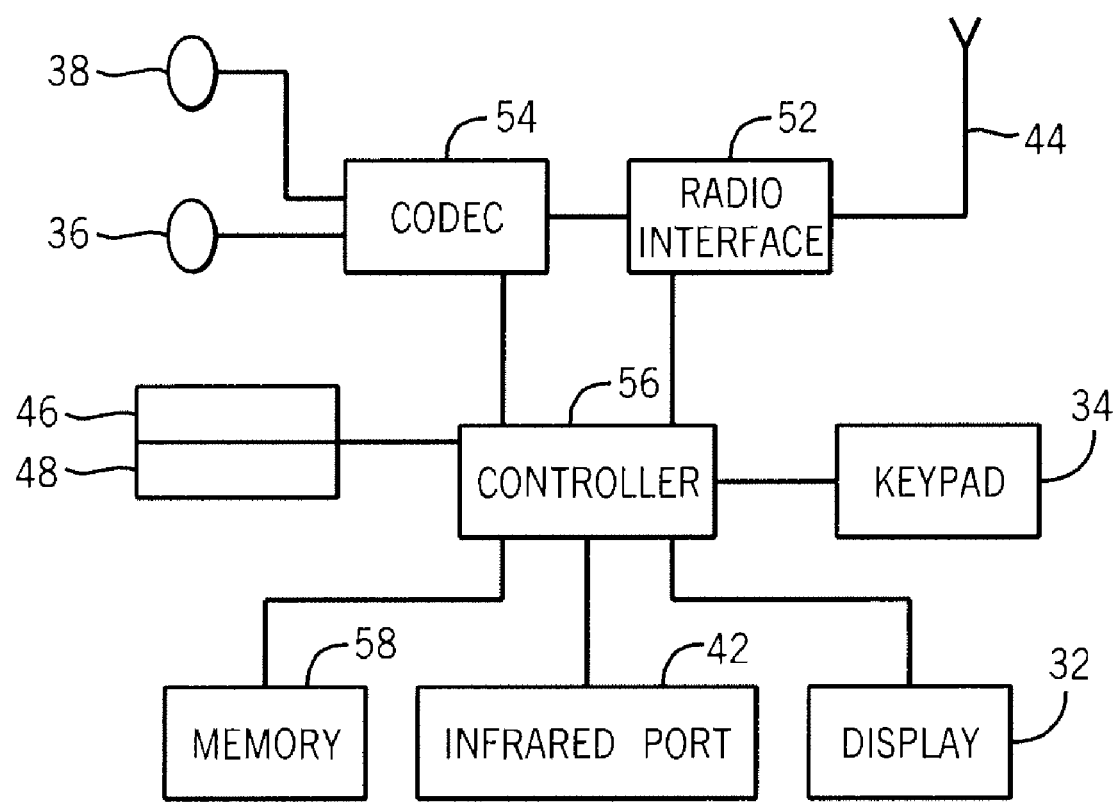
FIG. 9 is a schematic representation of the circuitry which may be included in the electronic device of FIG. 8.

FIGS. 8 and 9 show one representative electronic device 50 within which the present invention may be implemented. It should be understood, however, that the present invention is not intended to be limited to one particular type of device. The electronic device 50 of FIGS. 8 and 9 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The various embodiments of the present invention described herein is described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated.

What is claimed is:

1. A method, comprising:
    calculating, by a processor, a difference signal representing differences between sample values of a predicted block of data and values for an original input block;
    performing, by a processor, transform coding to the difference signal, thereby creating a first representation of a first component of the difference signal;
    performing, by a processor, spatial coding to the difference signal, thereby creating a second representation of a first component of the difference signal;
    joining, by a processor, the first and second representations to form a coded prediction error signal; and
    at least one of transmitting or storing the coded prediction error signal.

2. The method of claim 1, further comprising, before performing transform coding and spatial coding, substituting outlier values in the difference signal with non-outlier values to create a modified prediction error signal.

3. The method of claim 2, wherein transform coding is applied to the modified prediction error signal and spatial coding is applied to a residual thereof.

4. The method of claim 2, wherein spatial coding is applied to the modified prediction error signal and transform coding is applied to a residual thereof.

5. The method of claim 1, wherein, for transform coding, at least one transform coefficient is set to zero.

6. The method of claim 1, wherein, for spatial coding, at least one spatial sample is set to zero.

7. The method of claim 2, wherein the non-outlier values used to replace the outlier values comprise an average of neighboring prediction error values.

8. The method of claim 1, further comprising providing an indication that no transform coefficients exist in the block of data if appropriate.

9. The method of claim 1, further comprising providing an indication that no spatial samples exist in the block of data if appropriate.

10. The method of claim 1, wherein for the transform coding, a transform coefficient is formed, the transform coefficient comprising a weighting coefficient of a discrete transform basis vector.

11. The method of claim 10, wherein the discrete transform comprises a discrete orthogonal transform.

12. A computer program product, embodied in a non-transitory computer-readable medium, comprising computer code configured to perform the method of claim 1.

13. An apparatus, comprising:
a processor; and
a memory unit communicatively connected to a controller and comprising:
computer code for performing transform coding to the difference signal, thereby creating a first representation of a first component of the difference signal;
computer code for performing spatial coding to the difference signal, thereby creating a second representation of a first component of the difference signal; and
computer code for joining the first and second representations.

14. The apparatus of claim 13, wherein the memory unit further comprises computer code for, before performing transform coding and spatial coding, substituting outlier values in the difference signal with non-outlier values to create a modified prediction error signal.

15. The apparatus of claim 14, wherein transform coding is applied to the modified prediction error signal and spatial coding is applied to a residual thereof.

16. The apparatus of claim 14, wherein spatial coding is applied to the modified prediction error signal and transform coding is applied to a residual thereof.

17. The apparatus of claim 13, wherein, for transform coding, at least one transform coefficient is set to zero.

18. The apparatus of claim 13, wherein, for spatial coding, at least one spatial sample is set to zero.

19. The apparatus of claim 13, wherein the non-outlier values used to replace the outlier values comprise an average of neighboring prediction error values.

20. The apparatus of claim 13, further comprising providing an indication that no transform coefficients exist in the block of data if appropriate.

21. The apparatus of claim 13, further comprising providing an indication that no spatial samples exist in the block of data if appropriate.

22. A method, comprising:
receiving a coded prediction error signal, the coded prediction error signal including a plurality of transform coefficients and a plurality of spatial samples;
decoding, by a processor, the plurality of transformed coefficients into decoded transform information;
decoding, by a processor, the plurality of spatial samples into decoded spatial information; and
adding, by a processor, the decoded transform information, the decoded spatial information, and a reconstructed prediction of the block of data, thereby forming a decoded representation of the block of data.

23. The method of claim 22, wherein an indication is provided that no transform coefficients exist in the block of data if appropriate.

24. The method of claim 22, wherein an indication is provided that that no spatial samples exist in the block of data if appropriate.

25. The method of claim 22, wherein the decoding of the plurality of transformed coefficients and spatial samples includes dequantization of each, and wherein the dequantization of transformed coefficients and spatial samples are related to each other.

26. The method of claim 22, wherein the decoding of the plurality of transformed coefficients and spatial samples includes dequantization of each, and wherein the dequantization of transformed coefficients and spatial samples are different from each other.

27. The method of claim 22, wherein the decoding of the spatial samples is dependent upon the decoding of the transformed coefficients.

28. The method of claim 22, wherein the decoding of the transformed coefficients is dependent upon the decoding of the spatial samples.

29. The method of claim 22, wherein at least some of the plurality of spatial samples are decoded as a single unit.

30. A computer program product, embodied in a non-transitory computer-readable medium, comprising computer code configured to perform the method of claim 22.

31. An apparatus, comprising:
a processor; and
a memory unit communicatively connected to the processor and including:
computer code for processing a received coded prediction error signal, the coded prediction error signal including a plurality of transformed coefficients and a plurality of spatial samples;
computer code for decoding the plurality of transformed coefficients into decoded transform information;
computer code for decoding the plurality of spatial samples into decoded spatial information; and
computer code for adding the decoded transform information, the decoded spatial information, and a reconstructed prediction of the block of data, thereby forming a decoded representation of the block of data.

32. The apparatus of claim 31, wherein an indication is provided that no transform coefficients exist in the block of data if appropriate.

33. The apparatus of claim 31, wherein an indication is provided that that no spatial samples exist in the block of data if appropriate.

34. The apparatus of claim 31, wherein the decoding of the plurality of transformed coefficients and spatial samples includes dequantization of each, and wherein the dequantization of transformed coefficients and spatial samples are related to each other.

35. The apparatus of claim 31, wherein the decoding of the plurality of transformed coefficients and spatial samples includes dequantization of each, and wherein the dequantization of transformed coefficients and spatial samples are different from each other.

36. The apparatus of claim 31, wherein the decoding of the spatial samples is dependent upon the decoding of the transformed coefficients.

37. The apparatus of claim 31, wherein the decoding of the transformed coefficients is dependent upon the decoding of the spatial samples.

38. The apparatus of claim 31, wherein at least some of the plurality of spatial samples are decoded as a single unit.

39. A method, comprising:
   calculating, by a processor, a difference signal representing differences between sample values of a predicted block of data and values for an original input block;
   substituting, by a processor, outlier values in the difference signal with non-outlier values to create a modified prediction error signal;
   performing, by a processor, one of transform coding and spatial coding to the modified prediction error signal, creating one of a transform coded data and spatial coded data
   performing, by a processor, an inverse of the one of transform coding and spatial coding;
   applying, by a processor, the other of transform coding and spatial coding to a residual from the inverse transform or spatial decoding, creating the other of transform coded data and spatial coded data;
   joining, by a processor, the transform coded data and the spatial coded data to form a coded prediction error signal; and
   at least one of transmitting or storing the coded prediction error signal.

* * * * *